United States Patent
Fowe

(10) Patent No.: US 10,553,110 B2
(45) Date of Patent: Feb. 4, 2020

(54) DETECTION AND ESTIMATION OF VARIABLE SPEED SIGNS

(71) Applicant: HERE Global B.V., Eindhoven (NL)

(72) Inventor: James Adeyemi Fowe, Chicago, IL (US)

(73) Assignee: Here Global B.V., Eindhoven (NL)

( * ) Notice: Subject to any disclaimer, the term of this patent is extended or adjusted under 35 U.S.C. 154(b) by 8 days.

(21) Appl. No.: 15/631,320

(22) Filed: Jun. 23, 2017

(65) Prior Publication Data
US 2018/0374346 A1    Dec. 27, 2018

(51) Int. Cl.
| | |
|---|---|
| H04L 29/08 | (2006.01) |
| G08G 1/052 | (2006.01) |
| G08G 1/01 | (2006.01) |
| G06F 16/28 | (2019.01) |
| G08G 1/056 | (2006.01) |

(52) U.S. Cl.
CPC .......... G08G 1/052 (2013.01); G08G 1/0129 (2013.01); G08G 1/0133 (2013.01); *G06F 16/287* (2019.01); *G08G 1/056* (2013.01)

(58) Field of Classification Search
CPC ......... G06F 17/30241; G06F 17/30247; G06F 16/287; B60R 2300/804; G08G 1/052; G08G 1/0112; G08G 1/0129; G08G 1/0133; G08G 1/056; G06K 9/00818; G06K 9/6223
See application file for complete search history.

(56) References Cited

U.S. PATENT DOCUMENTS

| | | | | |
|---|---|---|---|---|
| 6,317,057 | B1 * | 11/2001 | Lee | G05D 1/0246 340/435 |
| 7,228,212 | B2 * | 6/2007 | Hijikata | B60N 2/6009 340/438 |
| 9,031,774 | B2 * | 5/2015 | Suk | B60W 30/12 701/300 |
| 9,240,123 | B2 * | 1/2016 | Stenneth | G08G 1/0125 |
| 9,609,046 | B2 * | 3/2017 | Fowe | H04L 67/10 |
| 9,851,205 | B2 * | 12/2017 | Fowe | G01C 21/10 |

(Continued)

FOREIGN PATENT DOCUMENTS

WO    WO2012089282 A1    7/2012

OTHER PUBLICATIONS

Kattan; et al., A Probe-Based Variable Speed Limit System, https://www.researchgate.net/publication/272118868_A_Probe-Based_Variable_Speed_Limit_System, pp. 1-24, Dec. 2014.

(Continued)

*Primary Examiner* — Hai Phan
*Assistant Examiner* — Son M Tang
(74) *Attorney, Agent, or Firm* — Lempia Summerfield Katz LLC

(57) ABSTRACT

Systems, methods, and apparatuses are disclosed for predicting or estimating the value of a variable speed sign (VSS). Probe data is received from multiple vehicles associated with a road segment. Location values are derived from the probe data. Center distance values are calculated based on the location values and the road segment. Clusters are derived from the probe data. Center distance values are grouped according to the respective clusters and a lane is assigned to at least one cluster based on the center distance values. The speed of the cluster predicts or estimates the corresponding lane of the VSS.

20 Claims, 13 Drawing Sheets

(56) References Cited

U.S. PATENT DOCUMENTS

| | | | | |
|---|---|---|---|---|
| 2005/0187684 A1* | 8/2005 | Hijikata | ............... | B60N 2/6009 701/45 |
| 2005/0200467 A1* | 9/2005 | Au | ............... | B60Q 1/34 340/465 |
| 2007/0208501 A1* | 9/2007 | Downs | ............... | B60T 7/18 701/119 |
| 2008/0208460 A1* | 8/2008 | Nakao | ............... | G01C 21/3602 701/532 |
| 2008/0243378 A1* | 10/2008 | Zavoli | ............... | G01C 21/28 701/533 |
| 2009/0140887 A1* | 6/2009 | Breed | ............... | G01C 21/165 340/990 |
| 2010/0295668 A1* | 11/2010 | Kataoka | ............... | B62D 15/025 340/435 |
| 2011/0010088 A1* | 1/2011 | Nagase | ............... | G01C 21/3655 701/533 |
| 2011/0248867 A1* | 10/2011 | Lee | ............... | G08G 1/0104 340/905 |
| 2012/0072080 A1* | 3/2012 | Jeromin | ............... | B60Q 1/143 701/49 |
| 2012/0173530 A1* | 7/2012 | Kurciska | ............... | G06F 17/30241 707/738 |
| 2012/0283942 A1* | 11/2012 | T'Siobbel | ............... | G01C 21/26 701/410 |
| 2012/0310504 A1* | 12/2012 | DuHadway | ............... | G01C 21/28 701/93 |
| 2013/0275033 A1* | 10/2013 | Bastiaensen | ............... | G01C 21/26 701/119 |
| 2014/0032100 A1* | 1/2014 | Park, II | ............... | G01C 21/30 701/446 |
| 2014/0358322 A1* | 12/2014 | Ibrahim | ............... | G05D 1/0055 701/1 |
| 2015/0198457 A1* | 7/2015 | Nagy | ............... | G08G 1/09626 701/431 |
| 2015/0312327 A1* | 10/2015 | Fowe | ............... | H04L 67/10 701/23 |
| 2015/0339927 A1* | 11/2015 | Han | ............... | B60W 40/10 701/301 |
| 2016/0042239 A1 | 2/2016 | Fowe et al. | | |
| 2016/0104376 A1 | 4/2016 | Fowe et al. | | |
| 2016/0259338 A1* | 9/2016 | Nakamura | ............... | B60W 30/12 |
| 2016/0379489 A1 | 12/2016 | MacFarlane | | |
| 2017/0004707 A1 | 1/2017 | Fowe et al. | | |
| 2017/0166254 A1* | 6/2017 | Katoh | ............... | B62D 15/0265 |

OTHER PUBLICATIONS

European Search Report for corresponding Application No. 18179162.5-1203, dated Nov. 21, 2018.

* cited by examiner

DETECTION AND ESTIMATION OF VARIABLE SPEED SIGNS

FIELD

The following disclosure relates to variable speed signs, or more particularly, specialized apparatus for determining variable speed sign values and providing mapping or navigation related featured based on the determined variable speed sign values.

BACKGROUND

Variable speed signs (VSS) are used to report variable speed limits in certain areas. VSS allow operators to adjust (e.g., raise or lower) the posted speed limit without changing a physical sign. The signs may be used in conjunction with intelligent transportation systems to adjust speed limits for several reasons including congestion, construction, accidents, or weather conditions. As technology advances, the ease of use of VSS is also increasing. Reported speed limits may be changed on the VSS remotely via email or telephone, at specific times of day, or manually via a control panel. VSS also may be used to alter speed limits based on real time traffic, weather conditions, or construction.

Municipalities (e.g., traffic management centers) that control the VSS may be unwilling to communicate the real time speed limits displayed on the VSS to third parties. In addition, automatic techniques for reading speed values from a VSS remain unreliable. Accordingly, there is a continuing effort to provide improved systems and methods for determining speed values from a VSS.

SUMMARY

Systems, methods, and apparatuses are disclosed for receiving probe data collected at a plurality of vehicles associated with a road segment, determining location values for the probe data, calculating, by a processor, center distance values for the location values based on the road segment, determining speed values for the probe data, performing, by the processor, an analysis on the speed values of the probe data to identify a first cluster of probe data and a second cluster of probe data, assigning center distance values to the first cluster of probe data, and calculating a lane assignment based on the center distance values assigned to the first cluster of probe data.

In another embodiment, an apparatus includes a memory configured to store probe data collected at a plurality of vehicles associated with a road segment, wherein location values and speed values are derived from the probe data, and a multi-modality detection and clustering device configured to calculate center distance values for the location values and analyze the speed values of the probe data to identify a cluster of probe data. A lane is assigned to a speed for the cluster of probe data based on a center distance value assigned to the cluster of probe data.

In another embodiment, a non-transitory computer readable medium including instructions that when executed on a computer are operable to collect probe data associated with a road segment; and send the probe data to a multi-modality detection and clustering device configured to calculate center distance values for the location values and analyze the speed values of the probe data to identify a cluster of probe data. A lane is assigned to a speed for the cluster of probe data based on a center distance value assigned to the cluster of probe data, and a message including the speed value is broadcasted to at least one vehicle traveling near the lane.

BRIEF DESCRIPTION OF THE DRAWINGS

Exemplary embodiments are described herein with reference to the following drawings.

DETAILED DESCRIPTION

Figure 1A:
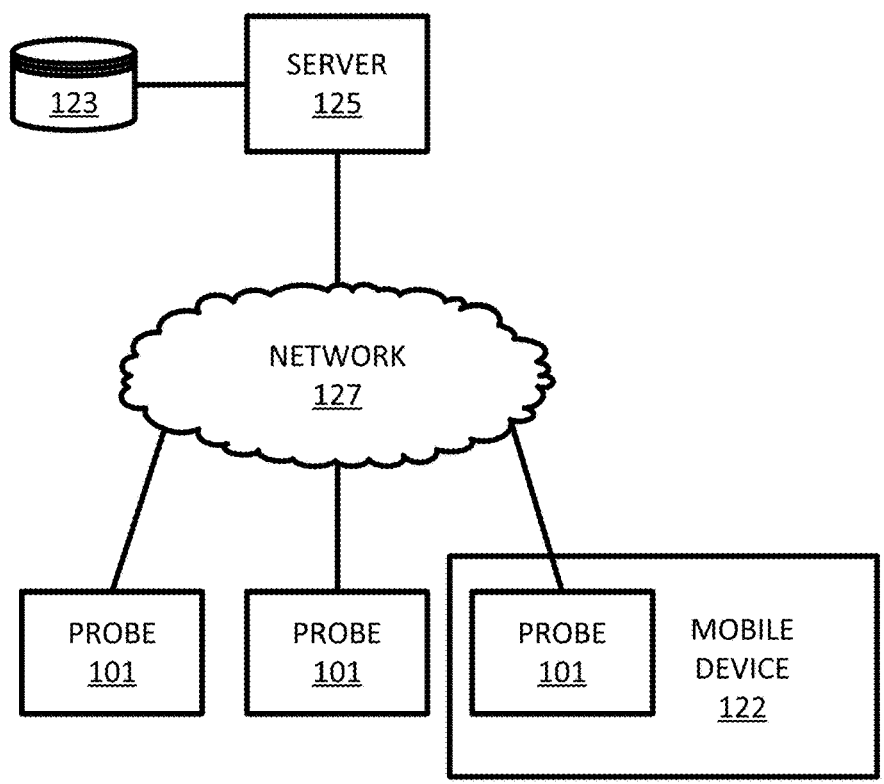
FIG. 1A illustrates an example system and network for determining speed values for a variable speed sign.

A variable speed sign may be used on a roadway to give travelers information about the road ahead. Speed limit values may be displayed on electronic signs positioned next to the road, over a portion of the traffic lanes, or overhead each traffic lane. In certain embodiments, the electronic signs may be displayed on a gantry extending over a portion of the roadway. Variable speed signs (VSS) are an important component of automotive cloud technology and highly assisted driving (HAD) technology. Vehicles may have high definition cameras and/or advance radar systems that can read the displayed value on VSS from a distance away. After the VSS speed is read by the camera or radar system, the current travel speed is checked and an alert can be provided to the driver if the vehicle speed surpasses the VSS value read by the camera for the current lane of travel. VSS speed values may be variable and a function of one or more of weather, traffic, time of day, day of week, construction, or other factors.

For example, weather related VSS may be used on roads where fog, ice, rain, snow, or other factors may influence safety. When weather conditions deteriorate visibility to the point that hazardous conditions are impending, the operating agency may adjust (e.g., reduce) the speed limit to help minimize the likelihood of a traffic accident. Traffic congestion related VSS may be used when traffic volumes are building and congestion is likely. When volumes and/or speed exceed a predetermined threshold, an operational strategy may be deployed to handle more traffic volume at a reduced, but not stop-and-go, speed.

In the case of construction related VSS, a long construction zone may often have actual construction occurring in only short segments of the zone. In addition, construction zones may be signed using static speed limit signs as if construction activity occurs throughout the entire day on each and every day. In reality, the intensity, duration, and location of construction activity may vary throughout the construction zone depending on the extent of work being performed. Providing more accurate and real time speed restrictions using VSS based on the level of construction activity may provide more accurate information to motorists and allow drivers to comply with the posted regulatory speed while improving safety in the construction zone. Adjusting (e.g., reducing) vehicle speed limits in active construction zones may improve safety for drivers and construction workers and may reduce the number and/or severity of accidents that occur in the zone.

There are several shortcomings with relying on visual detection such as camera for VSS display value detection. For example, a vehicle's camera may confuse 50 km/h with 80 km/h. In some instances, the vehicle operator may be incorrectly warned, which may impede on the operator's safety. In addition, applications that rely on a direct line of sight to the VSS cannot read the displayed values in certain low visibility situations. For example, heavy rain may occlude the VSS, and a vehicle behind a truck or trailer may not have line of sight to the VSS. Furthermore, most cars do not have front camera or radar system and cannot automatically read the VSS. In other words, the penetration ratio or percentage of cars with camera or video technology that are equipped to read a VSS display is low. Without camera technology vehicles may not be aware of a VSS displayed value from miles or fraction of a mile before the VSS. Subsequently, drivers cannot adjust their speeds timely.

The VSS may be an important component of the highly automated driving. Vehicles may include high definition cameras and light detection and ranging (LIDAR) systems that read the displayed value on a VSS from a long distance away. These advanced systems may be associated with high costs for the sensor infrastructure cost and may also face scalability problems if all vehicles were required to include the sensors.

When departments of transportation or DOTs for cities and/or states change the speed-limit value displayed on VSS, vehicles on the road are expected to obey the signs accordingly and adjust their speed to the speed-limit. Of course, this requires the drivers to see or vehicles to detect the change. While in some examples, VSS speed-limits may be detected and sent to connected-car clouds using in-car sensor cameras to do image recognition and obtain what value is being displayed, the following embodiments include systems and methods by which these speed-limits changes can be detected and estimated from real-time probes and then send this to the cloud infrastructure for other vehicles and/or users to request or otherwise access.

The following embodiments automatically detect and estimate the speed-limits displayed in VSS for different lanes. Based on the speed value, the vehicle's navigation system may alert the driver of any difference in operating speed from the predicted variable speed limit, or adjust the speed of the vehicle to approximate the predicted variable speed limit. In addition or in the alternative, one or more of the following embodiments may detect whether the vehicles on the road generally respond or obey the VSS placed on different lanes of the road or corresponding to the alerts. Finally, automotive manufacturers may utilize the calculated VSS data in real-time and for navigation guidance, autonomous driving and estimated time of arrival calculations. One or more of the following embodiments automatically detect and estimate the speed limit value using probes downstream of VSS gantries using a custom clustering algorithm technique.

The VSS speed-limit estimation provided by the following embodiments may be used as the estimated VSS speed for vehicles without cameras. Moreover, the estimation can be used as a confidence measure for vehicles that do have video technology. For example, if in a foggy condition a car with video sensors reports a VSS of 100 kph and then the estimation from probes is calculated as 98 kph, a high confidence may be determined that the vehicle correctly detected 100 kph even though it is foggy. Vehicles without a video sensor may utilize the estimation directly without the confidence determination. The speed limit estimation is made using only probe data, which reduces the cost for other sensors such as video, and may be implemented using only probes found in mobile devices.

FIG. 1A illustrates an example system for calculating speed sign values from a vehicle and providing the calculated speed sign values to other vehicles, a map developer, a navigation system, an autonomous vehicle or another device. The system includes one or more probes 101 and/or mobile devices 122. The system includes a server 125, a geographic database 123, and a network 127. The probe 101 may include one or more sensors or location circuitry for determination location data. The mobile device 122 may be a device housing the probe 101. The term "mobile device" may refer in the alternative to the probe or the device, or may refer to both the probe and the device as a unit. Additional, different, or fewer components may be provided. For example, a workstation may be connected to the server 125 to send commands and display data to the user, and any number of additions probes 101 or mobile devices 122 may connect with the network 127 and be coupled to the network 127. The phrase "coupled with" is defined to mean directly connected to or indirectly connected through one or more intermediate components. Such intermediate components may include hardware and/or software-based components. A map developer system may comprise the server 125 and one or more databases 123. Database 123 may be a probe database that stores probe data, which may include both historical and real data. Database 123 may be a geographic database including road links or segments, nodes, and point of interest data.

Figure 1B:
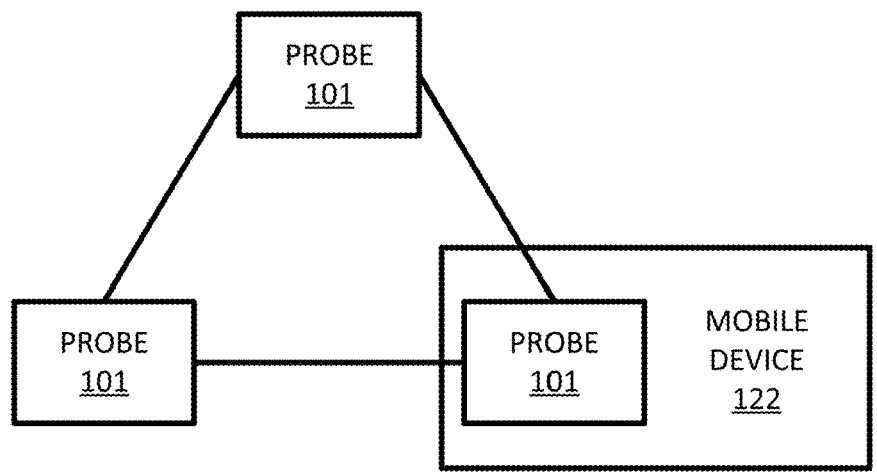
FIG. 1B illustrates an example system and point to point communication for determining speed values for a variable speed sign.

FIG. 1B illustrates a network of peer to peer devices using probes 101 or mobile devices 122. The peer to peer devices communication with each other to trade probe data and perform and of the following embodiments. Each of the peer to peer devices may independently calculate speed sign values or one of the devices may calculate the speed sign values and communicate the speed sign values to other vehicles. The following description applies to either of the arrangements of FIGS. 1A and 1B and other arrangements.

Each probe 101 may be associated with a different mobile device 122 or a different vehicle. The probe 101 may generate probe data including location data. The probe data may comprise probe packets including any combination of a device identifier, a time stamp, a first location coordinate, a second location coordinate, and a third location coordinate. The device identifier may include an alphanumerical number (e.g., serial number) for the probe 101 or the mobile device 122. The device identifier may describe the type of probe (e.g., global positioning system—GPS, global navigation satellite system—GNSS) and/or the type of device (e.g., smartphone or vehicle integrated navigation system). In other examples. the device may be a personal navigation device ("PND"), a portable navigation device smart phone, a mobile phone, a personal digital assistant ("PDA"), a tablet computer, a notebook computer, and/or any other known or later developed mobile device or personal computer. Non-limiting embodiments of navigation devices may also include relational database service devices, mobile phone devices, or car navigation devices.

The time stamp may include a numerical value for a time of day and/or a date. The location coordinates may include latitude, longitude, altitude, or another coordinate system. The probe packets may also include speed data, which may be calculated by the probe 122 or mobile device 122. The probe packets or location coordinates may be stored in memory of the mobile device 122 or server 125.

The server 125 receives the probe data or probe packets from the mobile device 122 or probe 101 through network 127 and/or the mobile device 122 receives the probe data or probe packets from the probe 101. The mobile device 122 or the server 125 may retrieve the location coordinates from the probe packets. The retrieval may correspond to determining location values for the probe data. The mobile device 122 or the server 125 may associate the location coordinates with a path or road segment based on map matching. The map matching may correspond to determining location values for the probe data. The mobile device 122 or the server 125 may perform geolocation in order to derive the location coordinates from sensor data collected by the probes. The geolocations may correspond to determining location values for the probe data. Any of these examples may include identifying a path or road segment or access the path or road segment from memory of the mobile device 122 or the server 125.

The mobile device 122 or the server 125 may identify a center point or line for the road or path segment associated with the location values of the probe data. The center point or line may include one or more points that represents the center location of the road or path segment. The center line may be the two-dimensional line representing the road segment or link. The center line may be calculated as the average or halfway point between the left border of the road and the right border of the road. The center line may be represented by location coordinates described above.

The mobile device 122 or the server 125 may calculate center distance values for the location values with respect to the center point or line. The center distance values may be calculated as a difference between the location values from the probe data with the center points or line of the road segment. A first center distance value may be calculated by subtracting a first probe point from the center line, a second center distance value may be calculated by subtracting a second probe point from the center line, and so on.

The mobile device 122 or the server 125 may calculate or determine speed values for the probe data. Speed values may be calculated from two or more, a series, of probe points. The difference between the probe points (subtract one set of location values) or distance between the probe points (square root of the difference of the coordinates squared) divided by time, or the difference in timestamps from the probe points.

The mobile device 122 or the server 125 may perform an analysis on the speed values of the probe data to identify clusters such as a first cluster of probe data and a second cluster of probe data. The clusters may be identified using a variety of clustering techniques or algorithms such as K-means clustering, expectation maximization clustering, or affinity propagation clustering. The number of clusters from the speed values from the probe data indicates the number of different lanes, or the number of different lanes with distinct speed limits. The number of speed limits may be calculated based on a quantity of clusters including. Each cluster may be centered around or associated with speed values from a particular speed range.

When a road has a VSS indicating a low speed for one lane and a high speed for one lane, vehicles traveling on the roadway, when grouped by speed, generally form two groups or clusters. One of the clusters is closer to the low speed, and one of the groups is closer to the high speed. Outliers may be removed when clustering the groups. The mobile device 122 or the server 125 may calculate a quantity of lanes from the analysis of speed values because the number of clusters is equal to the number of lanes, or the number of lanes with substantially different speed limits.

The mobile device 122 or the server 125 may automatically detect this pattern when it happens and also able to partition the data into the two respective clusters and obtain the low speed and the high speed as representative values for the clusters. The representative speed value for a cluster may be selected as the media of the speeds in the cluster, or an average of the speeds in the cluster. The representative speed may be selected from a predetermined percentile (e.g., $25^{th}$ percentile, $60^{th}$ percentile or $80^{th}$ percentile) of the speed values. That is, among the cluster, the speed values are arranged in order and a speed value that is not in the center or average may be selected as the representative value.

The mobile device 122 or the server 125 may assign center distance values to the clusters of probe data. The center distance values previously calculated for the location values, or probe data, with respect to the center point or line and assigned to the clusters of probe data. In one example, the center distance values associated with the probe data in the clusters are averaged to calculate the center distance value that is assigned to the cluster. In other examples, the median of the center distance values associated with the probe data in the clusters is assigned to the cluster. In another example, the selected center distance values may be based on the representative speed. For example, center distance values for probe data at the representative speed or within a range of the representative speed are averaged to determine the center distance value that is assigned to the cluster.

The mobile device 122 or the server 125 may calculate a lane assignment based on the center distance values assigned to the first cluster of probe data. The lane assignment assigns a speed value to a lane of the road segment. The lane assignment may be determined based on road attributes and the center distance values, based only on the center distance values, or based on the polarity or direction of the center distance values.

When the lane assignment is determined based on the road attributes and the center distance values, the server 125 retrieves road attributes from the geographic database 123, or the mobile device 122 retrieves the road attributes from a local database. The road attributes may include a width of the lanes or a quantity of lanes. From the width of the lanes, the center distance values are aligned to their respective lanes. Center distance values less than approximately one lane width may be assigned to a center lane, when an odd number of lanes are included. Positive center distance values less than approximately one lane width may be assigned to a left lane of two center lanes, and negative center distance values less than approximately one lane width may be assigned to a right lane of two center lanes. Center distance values greater than approximately one lane width may be assigned to other lanes according to lane width and polarity of the center distance values.

Simpler assignments may be used in specific circumstances. The lane assignments may be based only on the center distance values without any road attributes or predetermined lane widths. That is, the lane widths may be inferred from, or calculated from the center distance values. When the clusters have center distance values of +1.5x, +0.5x, −0.5x, and −1.5x the lane assignments are far left lane, left center lane, right center lane, and far right lane, respectively. When the clusters have center distance values of +X, 0, and −X, the lane assignments are left lane, center lane, and right lane, respectively. In another example, when the quantity of lanes is two lanes, the assignment may be based on the polarity or direction of the center distance values. A positive center distance value may correspond to a left lane and a negative positive center distance value may correspond to a right lane.

The mobile device 122 or the server 125 may determine a variety of commands or messages from the assignment of the speed value to a lane of the road. The assignment of the speed value may indicate a speed limit and the mobile device 122 or the server 125 may issue a warning to a subsequent vehicle when current speed exceeds the speed value. The assignment of the speed value may indicate a traffic level in the lane. Routing, directions from an origin to a destination, may be calculated based on the traffic level. Additionally, the traffic level may be presented on a map or otherwise transmitted in a traffic message to indicate the traffic level of the lane. The speed limit assign to the lane may also be used to derive a driving alert such as an instruction to the driver to change lanes. The speed limit assign to the lane may also be used to derive a driving command for an automated driving system to change lanes, speed up, or slow down according to the speed value assigned to the lane.

The server 125 stores the estimated speed limit value for the variable speed sign and reports the estimated speed limit value. For example, the speed limit value may be sent to another mobile device 122. The mobile device 122 may issue warnings when a current speed exceeds the speed limit value. The mobile device 122 may be a highly assisted driving (HAD) vehicle or autonomous vehicle that controls a speed of a vehicle according to the speed limit value. Additional embodiments and details are discussed below.

Figure 2:
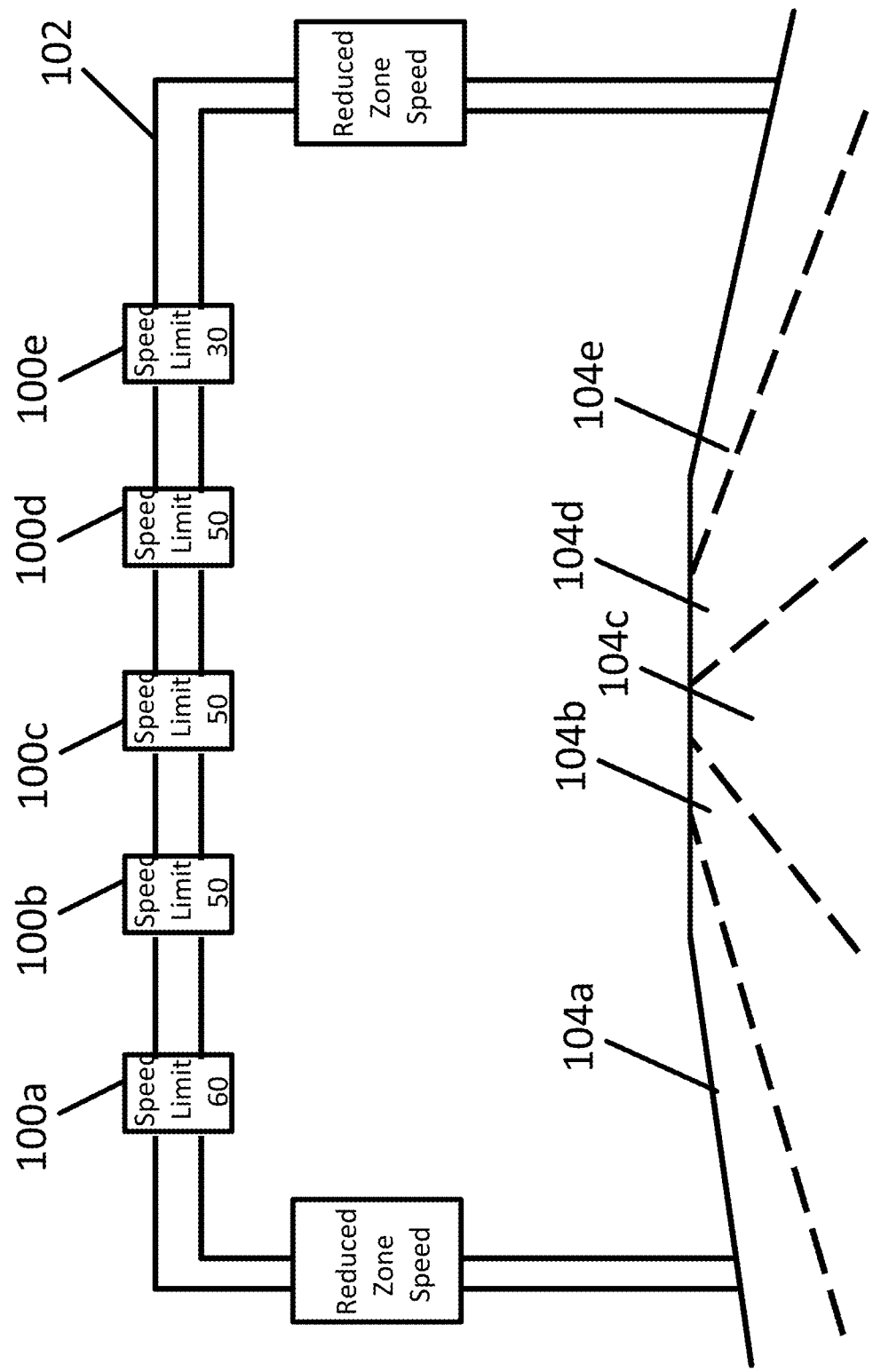
FIG. 2 illustrates an example gantry displaying a plurality of variable speed signs.

FIG. 2 illustrates an example gantry 102 connected to variable speed signs 100a-e, which may be electronic signs display speed values (e.g., speed limits, speed guidelines, or detected speeds) are displayed over traffic lanes 104a-e of a roadway. Additional, different, or fewer components may be included. The VSS may be on signs adjacent to the roadway (e.g., a left side VSS and a right side VSS). The VSS may be projected on the roadway surface.

As depicted in FIG. 2, an electronic sign is positioned over each traffic lane to display the actual speed limit value for the traffic lanes 104a-e or for individual traffic lanes such that VSS 100a corresponds to lane 104a. In other embodiments, a single electronic sign may be positioned over one of the traffic lanes, or on the side of the road next to the traffic lanes. In yet other embodiments, a plurality of electronic signs less than the total number of traffic lanes may be positioned over or next to a portion of the traffic lanes of the roadway.

In certain embodiments, the electronic sign(s) may include variable speed limit values. The signs may also include additional text such as "CAR" or "TRUCK," to provide additional information regarding which vehicles the displayed speed limit value pertains (e.g., the variable speed limit value for a car could be 60 while the speed limit value for a truck could be 50).

The server 125 is configured to identify a VSS. For example, the geographic database 123 may include geographic locations of multiple variable speed signs. The server 125 may receive a location value and select the variable speed sign based on the location value. The location values may be received from a navigation application (e.g., current position of a user) or from a mapping application (e.g., selected position from a user). The procedures for identifying speed limits and assigning speed limits may be initiated in response to the identification of a VSS. The server 125 may select probe data downstream of a VSS in response to the identification of the VSS.

Figure 3:
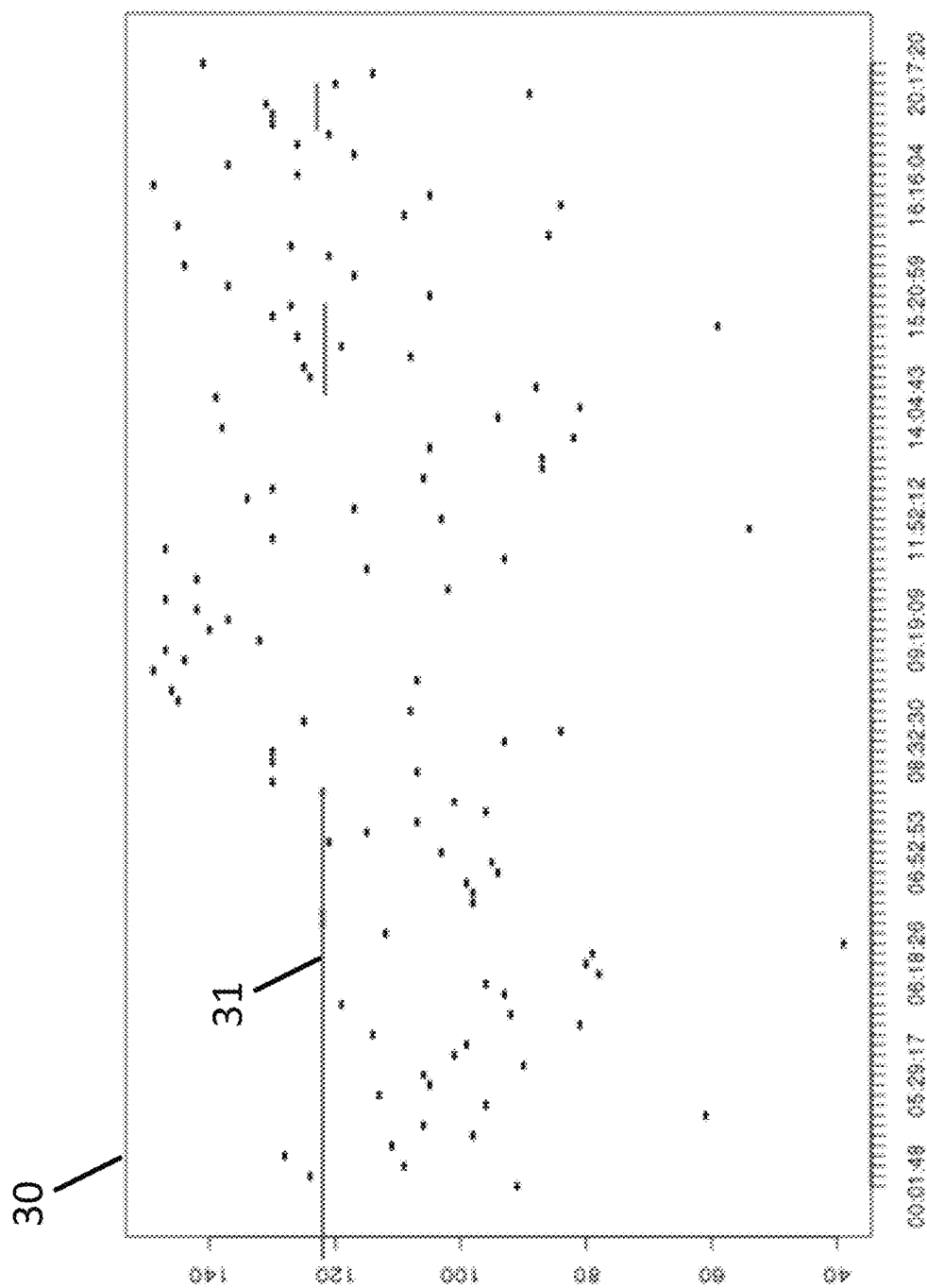
FIG. 3 illustrates an example chart of probe distribution downstream of a gantry.

FIG. 3 illustrates an example chart 30 of probe distribution downstream of a gantry. The vertical axis is speed (e.g., miles per hour or kilometers per hour) and the horizontal axis is time. FIG. 3 illustrates a multi-modality in the probe speeds downstream to the gantry, which is an indication of the change in speed limit on the road (i.e. some lanes having different speed limits compared to others at different times of the day). Data was collected for a particular VSS gantry over a day period shown in the pattern in FIG. 3. At earlier times of the day, the highest VSS speed-limit was capped to 120 kph and then released later in the day, and then capped 120 kph at sometimes of the day as indicated with line 31. While it is not visible to the eyes in this scattered plot, it might of interest to note that there are also lower speed clusters around 80 kph, 100 kph, and others during the day, which may indicate speed-limits displayed on the other non-fastest lanes.

Figure 4:
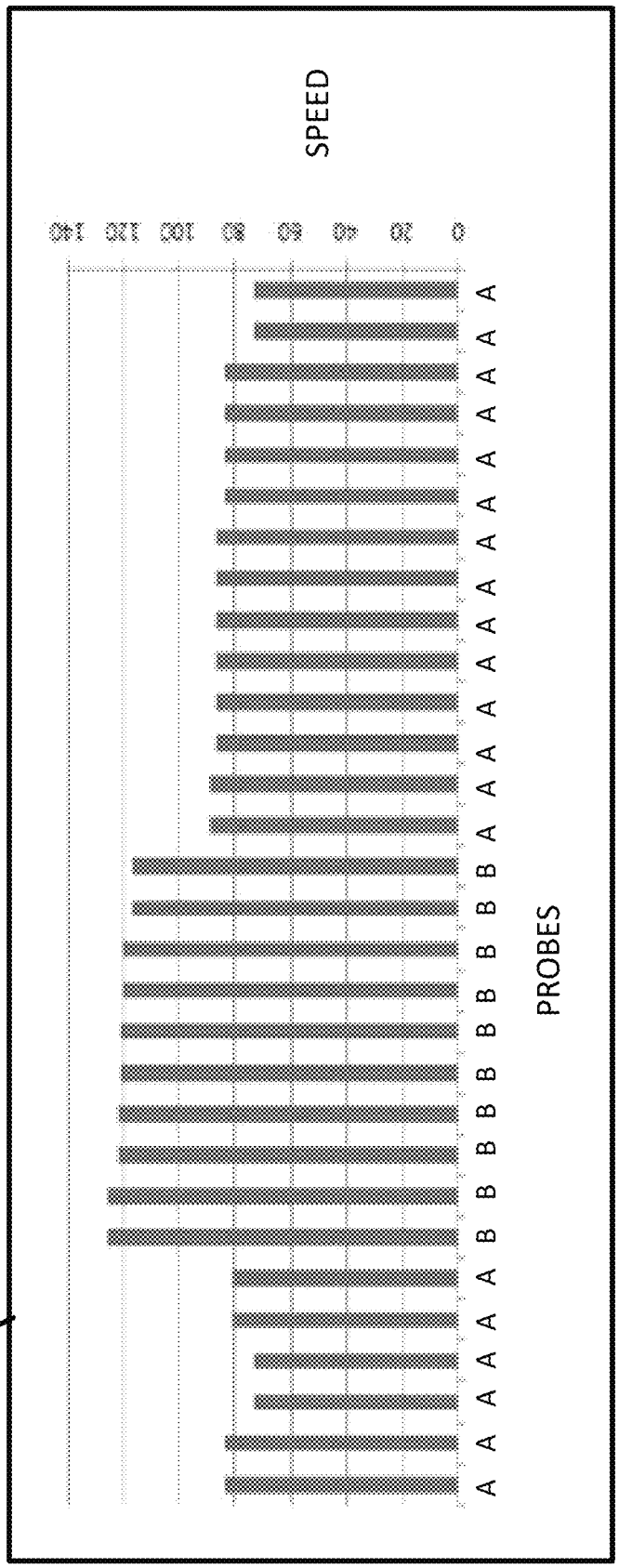
FIG. 4 illustrates an example chart of speed distribution.

FIG. 4 illustrates an example chart 40 of speed distribution. The multi-modality detection and clustering (MDC) algorithm is configured to detect there is multi-modality or multiple modes or speed clusters in the probe speeds in that some probes on some lanes are moving at different speeds compared to other lanes. The example of FIG. 4 illustrates multi-modality including modes or speed clusters labeled A and B. The MDC algorithm may detect when this is happening in real-time and ignore the road-link or gantry when all the speed-limits are uniform.

The following is an example pseudocode for the MDC Algorithm:

```
V ← {a vector or a list of values}
function MDC(V):
    s ← STD(V)
    m ← mean(V)
    V ← V ∀ V < m + 2s & V > m − 2s  //first outlier filtering
    R ← Range(V)
    d ← R/16
    for i ← 1 to 16 //bucketizing
        b_i ← {V ∀ V < max(V) & V > (max(V) − d)}
        V ← V − b_i
    end for
    V ← b_1 + b_2 + . . . + b_16  //restore V
    C ← 1
    for i ← 2 to 16 //cluster search
```

$$MG \leftarrow \frac{mean(b_1) - mean(b_i)}{R}$$

```
        if |b_1| > 8 and MG > 0.3 and |V − b_1| > 8  //8 & 0.3 are tuning paramters
        then {
            MD ← {C,mean(b_1),size(b_1),STD(b_1),MG}
            C ← C + 1
            V ← V − b_1
```

```
        b₁ ← bᵢ
      }
      else b₁ ← b₁ + bᵢ
      end if
   end for
   MD ← {C,mean(b₁),size(b₁),STD(b₁)}
   return MD
end MDC
```

The MDC algorithm not only detects, it also clusters and partitions speeds, such that the probes on the lanes with uniform speed limits are clustered separately since they have similar speed range. If the algorithm returns two speed-clusters then it means there are about two different speed-limits on the road, if it returns 3 clusters, then there may be 3 speed-limits (or speed-profiles) on the link in real-time.

Figure 5:
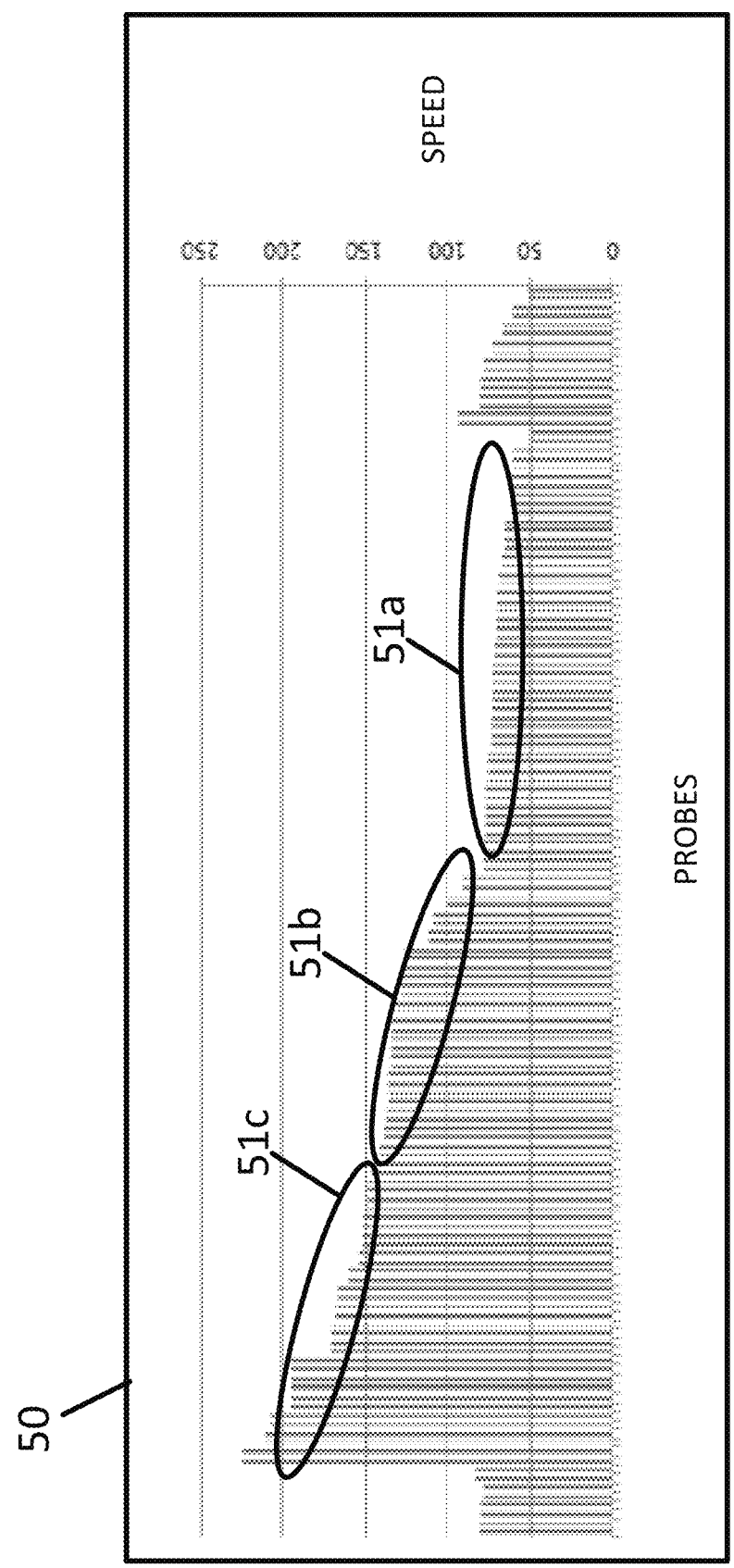
FIG. 5 illustrates an example chart of speed distribution and annotated clusters.

FIG. 5 illustrates an example chart 50 of speed distribution and annotated clusters. Speed values with a magnitude along the y-axis are arranged in time along the x-axis. The speed values are correlated with time. The speed distribution in FIG. 5 may produce 3 speed clusters a first cluster 51a around 75 kph, a second cluster 51b around 125 kph and a third cluster 51c around 170 kph. The first cluster 51a may correspond to a first speed limit that occurred early in the day, the second cluster 51b may correspond to a second speed limit that occurred later in the day, and the third cluster 51c may correspond to a third speed limit that occurred even later in the day.

The server 125 or the mobile device 122 may identify the clusters 51a-c through a statistical analysis that groups the data according to speed values. The mode is the value that occurs most often in the cluster. The speed data in a cluster may be rounded to a whole number or predetermined increment. For example, if the predetermined increment was 5 mph the data was be organized to include only multiples of 5 mph such as 45 mph. 50 mph, 55 mph, 60 mph and so on. The statistical analysis may identify a first mode for cluster 51a, a second mode for cluster 51b, and a third mode for cluster 51c. The mode values for the clusters are used as the speed values that are assigned to lanes using the MDC algorithm.

Figure 6:
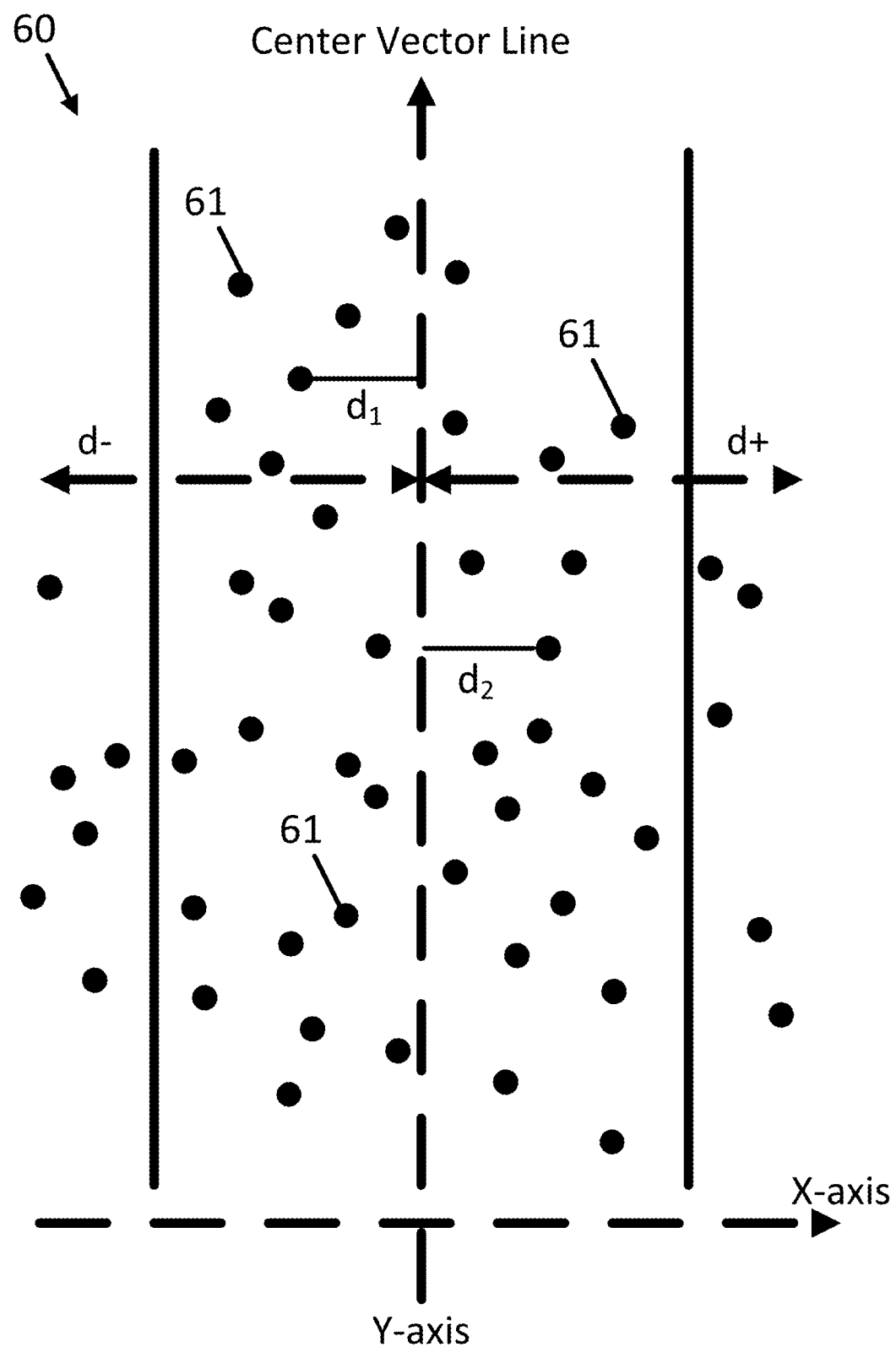
FIG. 6 illustrates example data for road center distance values.

FIG. 6 illustrates example data 60 for center distance values. The initial step in probe processing may include map matching, which is a technique of mapping or matching a raw GPS probe location (e.g., only coordinate data) to the nearest and/or most probable road segment (or link). GPS map-matching algorithms alone do not achieve lane-level precision or granularity. It has been practically impossible due the intrinsic errors in GPS probes and because the data is highly noisy such that it can have the location (latitude/longitude) information reported anywhere in a wide range. Current GPS data may vary within a 20 meter radius, which is large when comparing adjacent lanes of travel. Very good map-matching algorithms have been able to achieve link-based map-matching, but to get lane-level precision has been impossible with the current GPS technologies. Therefore, through GPS alone, it is not possible to determine which speeds are on a specific lane.

The MDC algorithm utilizes the GPS data in two stages to achieve lane matching. The first step performs map-matching to math a road segment, then the MDC algorithm re-exploits the raw GPS probes data to determine the lane-alignment (or lane ordering) of probe clusters by generating the center deviation or "d-value" which is the distance between the raw GPS probe 61 and the road center-line (center line vector) as illustrated in FIG. 6. Example d-values are illustrated by lines $d_1$ and $d_2$. In this example, d-values to the left of the center line vector have negative values and d-values to the right of the center line vector have positive values.

This signed d-value metric may be calculated for each probe and allows for approximate lane ordering of probe clusters. For example, for each cluster of probes from the MDC algorithm output, the mean or median d-value is computed and compared with other clusters. The median d-value for each cluster will indicate the lane positioning of that cluster either on the left or right or center and to what extent. The sign or polarity of the d-value indicates direction of the lane and the absolute value of the d-value indicates how far the lane is from center.

Figure 7:
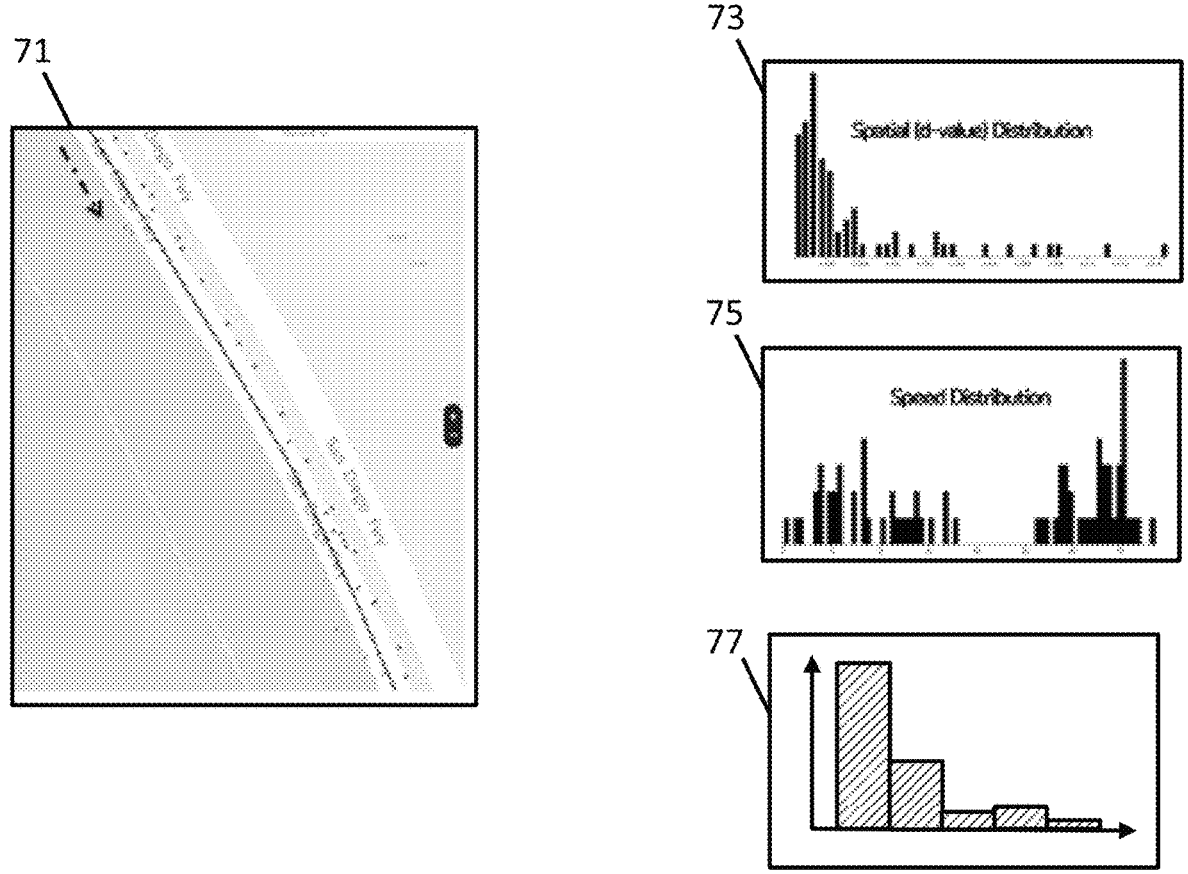
FIG. 7 illustrates example of clusters using center distance values.

FIG. 7 illustrates an example of clusters using center distance values for a particular roadway. A map 71 illustrates the geographic region and the particular roadway where the probe data was collected. The distance between each raw GNSS probe and the centerline vector (road center) is used as a metric for the multi-modal spatial distribution illustrated by spatial distribution graph 73.

The clustering technique may select an initial value either randomly or according to a predetermined value and calculate a distance from the initial value for the data in order to assign the closest data values to the initial value. This process is repeated until further iterations do not improve the total distance. In the example of FIG. 7, the speed obtained per lane when the d-value distribution is partitioned into 5 k-means clusters.

FIG. 7 also illustrates the lane-alignment value the d-values bring to probes lane-level inference. The speed distribution 75 illustrates that the data is multi-modal (two clusters). Some cars are driving fast while some are in congestion. This is confirmed by the histogram 77. The histogram includes a box for each lane associated with a different speed and a height associated with speed. The histogram 77 shows which specific lanes are faster and which ones are congested.

Figure 8:
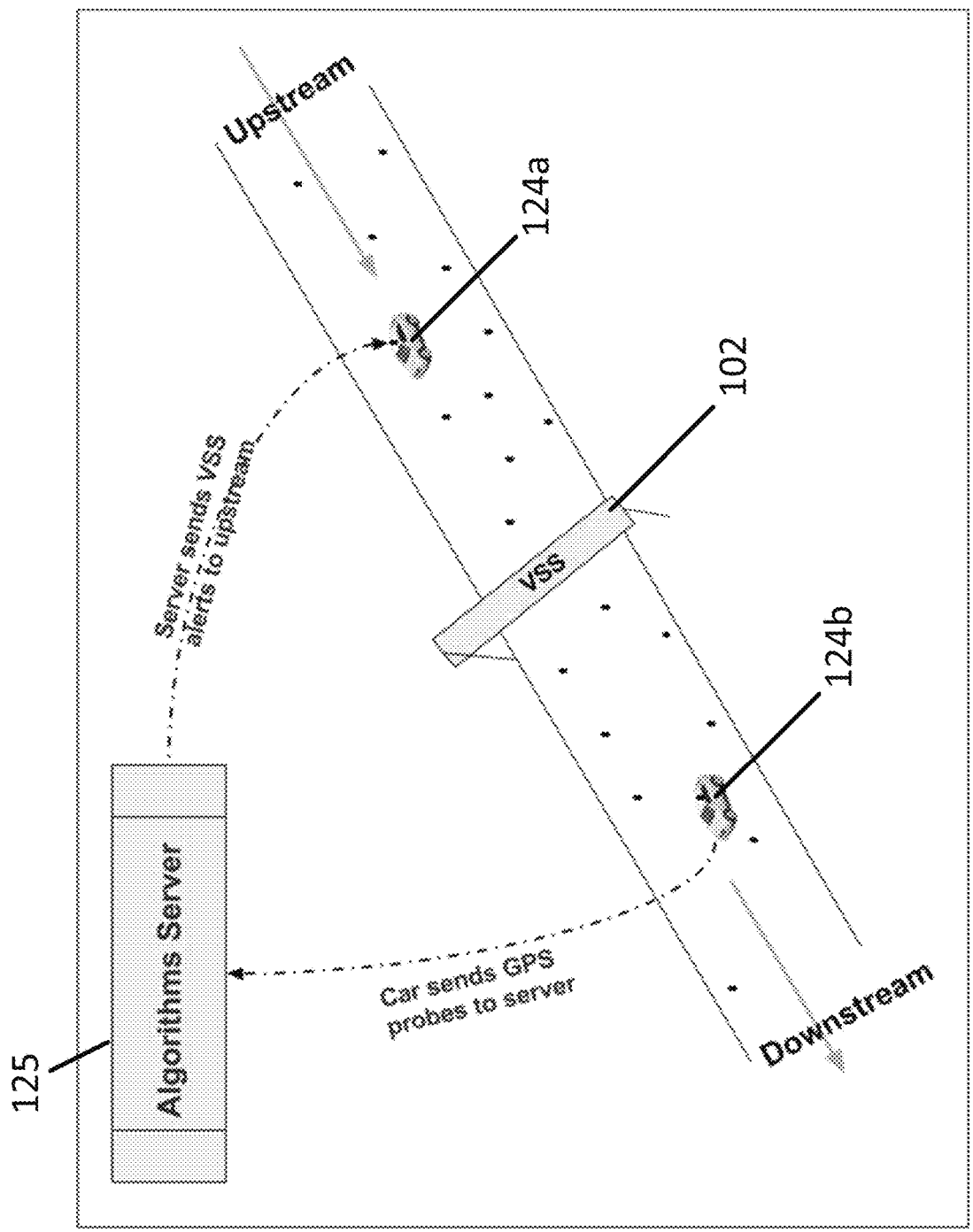
FIG. 8 illustrates an example of vehicle communication for speed values for a variable speed sign.
Figure 9:
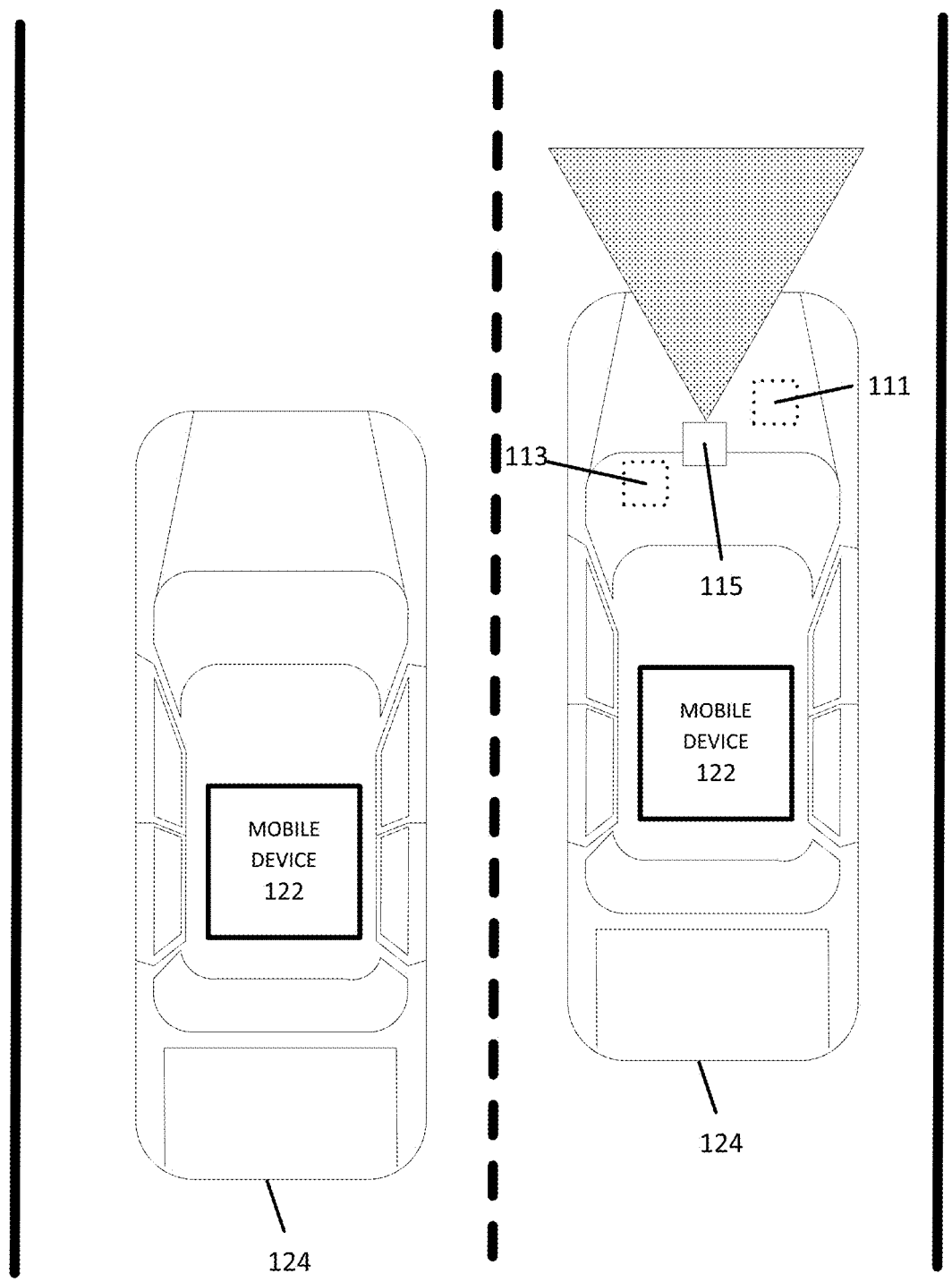
FIG. 9 illustrates example vehicles and sensor arrays.

FIG. 8 illustrates an example of vehicle communication for speed values for a variable speed sign (VSS) 102. At least one downstream vehicle 124b has already passed the VSS 102 and at least one upstream vehicle 124a is approaching the VSS 102. The downstream vehicles 124b send GPS probes to server 125 (algorithms server), which performs the MDC algorithm. The server 125 may generate and send a variety of messages or data packets to the upstream vehicles 124a. FIG. 9 illustrates example vehicles 124 including sensor arrays. In one example, the vehicle 124 includes a probe associated with mobile device 122, and in another example, the vehicle 124 includes any combination of a variety of sensors. The mobile device 122 may be a handheld device with a display or audio output or an in-vehicle device with a display or audio output. The data packets sent from the server 125 may include speed values and the mobile device 122 generates an alert in response to the speed value. Alternatively, the data packets sent from the server 125 may include alerts for the user that are displayed or otherwise presented by the mobile device 122. The data packets may include alerts for the upstream vehicle 124a based on data collected by at least the downstream vehicle 124b.

The received speed value may be identified as a speed limit. The mobile device 122 may receive current or real time probe data to calculate a current speed. The speed limit received from the MDC algorithm is compared to the current speed. When the current speed is greater than the speed limit, or more than a predetermined amount greater than the speed limit, the mobile device 122 presents a speed warning to the user or driver. The alert provides the driver a caution warning to reduce speed and decide which lanes to drive on ahead of time, depending on preferred speeds.

In another example, the alert relates to an upcoming section of roadway. The current or real time probe data indicates that the mobile device 122 is approaching the section of road for the speed limit received from the MDC algorithm. The alert may indicate that the speed limit is about the change. An example may include "reduced speed-limit ahead; 50 kph limits on the right-lane(s) and faster speed-limit 60 kph on the left-lane(s)."

In another example, the speed limit is provided as part of a navigation system. For example, the mobile device may provide a routing message based on the speed limit. The routing message may select a route or road segment based on the speed limit received from the MDC algorithm. For example, selection of an optimal rate may compare two possible routes with at least one of the routes including the speed limit received from the MDC algorithm. In another example, the user may be prompted with lane selection options and the associated speed limits. Similarly, the speed limit may be displayed by the navigation system as an estimate of a VSS. The mobile device 122 may display a graphic of a VSS with numerical indicators for each of the lanes of the roadway.

In another example, the speed limit is provided as part of a traffic system. The mobile device 122 may include a real time map display of only roads with VSS where the lane-level speed limits have changed. That is, the VSS changes may be highlighted on a map. The speed limit received from the MDC algorithm is included in the traffic message.

In another example, the data packets may include commands for the upstream vehicle 124a. The vehicles 124a may be autonomous vehicles. The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may generate a driving command based on the speed limit from the MDC algorithm or receive the driving command from the server 125. The driving command may be an instruction to signal and/or steer the vehicle to change lanes. The driving command may be an instruction to speed up, slow down (brake), or another driving function in response to the speed limit received from the MDC algorithm. The driving command may be an auxiliary function such as turn signal or headlight steering in response to the speed limit received from the MDC algorithm.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible.

The vehicles 124 include position circuitry such as a dead reckoning-type system, cellular location, or combinations of these or other systems. The positioning circuitry may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer built or embedded into or within the interior of the mobile device 122. The accelerometer is operable to detect, recognize, or measure the rate of change of translational and/or rotational movement of the mobile device 122. The mobile device 122 receives location data from the positioning system. The location data indicates the location of the mobile device 122. The position circuitry may be included in the mobile device 122 or in another module of the vehicle.

In addition, the autonomous or highly automated driving vehicle may include sensors for identifying the surrounding and location of the car. The sensors may include light detection and ranging (LIDAR), radar, and cameras for computer vision. Proximity sensors may aid in parking the vehicle. The proximity sensors may detect the curb or adjacent vehicles. The autonomous or highly automated driving vehicle may optically track and follow lane markings or guide markings on the road.

One additional example, an engine sensor 111, may include throttle sensor that measures a position of a throttle of the engine or a position of an accelerator pedal, a brake sensor that measures a position of a braking mechanism or a brake pedal, or a speed sensor that measures a speed of the engine or a speed of the vehicle wheels. Another additional example, vehicle sensor 113, may include a steering wheel angle sensor, a speedometer sensor, or a tachometer sensor. Another additional and optional example, vehicle sensor 115 may be a camera, a light detection and ranging (LIDAR) sensor, a radar sensor, or an ultrasonic sensor. The vehicle sensor 115 may determine road status such as the shape or turns of the road, the existence of speed bumps, the existence of pot holes, the wetness of the road, or the existence or ice, snow, or slush.

The vehicle sensor 115 may be programmed to identify a VSS and read or capture the displayed speed limit value. In some embodiments, the sensor 115 may be programmed to read or capture the displayed speed limit value of a VSS positioned on an overhead gantry above the same traffic lane as the vehicle. In other embodiments, the sensor 115 may be programmed to read or capture the displayed speed limit value of a VSS positioned on a gantry above a separate traffic lane or along the side of the road if no VSS is positioned above each traffic lane. In yet other embodiments, the sensor 115 may be programmed to read or capture additional text on the VSS such as "CAR" or "TRUCK." To the extent the vehicle 124 is a car, the sensor 115 may be programmed to further process a speed limit value associated with a VSS labeled "CAR." To the extent the vehicle 124 is a truck, the sensor 115 may be programmed to further process a speed limit value associated with a VSS labeled "TRUCK." The results of the MDC algorithm may be compared with the determination from the sensor 115 to confirm or check each other.

In one alternative, the upstream vehicle 124a relays messages to other vehicles using vehicle to vehicle communication. That is, a first vehicle may receive the speed limit from the MDC algorithm and transmit to a second vehicle in the vicinity, with a predetermined distance, from the first vehicle. The vehicle to vehicle communication may be through a wireless network. Example wireless networks include cellular networks, the family of protocols known as WiFi or IEEE 802.11, the family of protocols known as Bluetooth, or another protocol. The cellular technologies may be analog advanced mobile phone system (AMPS), the global system for mobile communication (GSM), third generation partnership project (3GPP), code division multiple access (CDMA), personal handy-phone system (PHS), and 4G or long term evolution (LTE) standards, or another protocol.

In another example, the data packets may be forwarded to a third party such as a department of transportation or municipality for testing VSS performance. The speed limit data may be compared to the actual settings of the VSS to determine drivers reactions to VSS changes.

Figure 10:
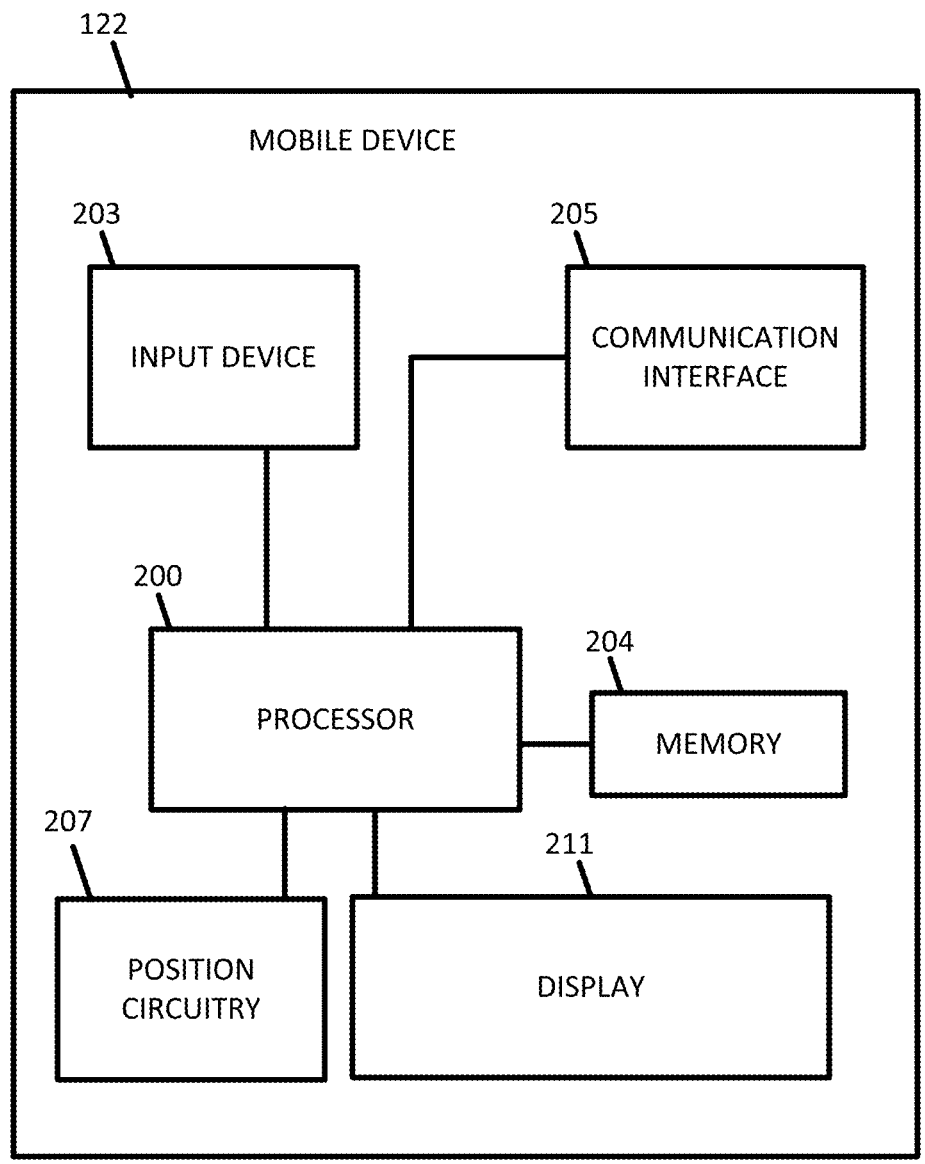
FIG. 10 illustrates an example navigation device of the system of FIG. 1.

FIG. 10 illustrates an exemplary mobile device 122 of the system of FIG. 1. The navigation device 122 includes a processor 200, a memory 204, an input device 203, a communication interface 205, position circuitry 207, and a display 211. The input device 203 may receive input from a user for selecting the details of the MDC algorithm such as threshold for clustering or defining lanes, clustering techniques, or the type of output from the MDC algorithm. Additional, different, or fewer components are possible for the mobile device 122.

The processor 200 may be configured to receive data indicative of the location of the navigation device 122 from the position circuitry 207. The positioning circuitry 207, which is an example of a positioning system, is configured to determine a geographic position of the navigation device 122. The positioning system may also include a receiver and correlation chip to obtain a GPS signal. The positioning circuitry may include an identifier of a model of the positioning circuitry 207. The processor 200 may access the identifier and query a database or a website to retrieve the accuracy of the positioning circuitry 207 based on the identifier. The positioning circuitry 207 may include a memory or setting indicative of the accuracy of the positioning circuitry.

Figure 11:
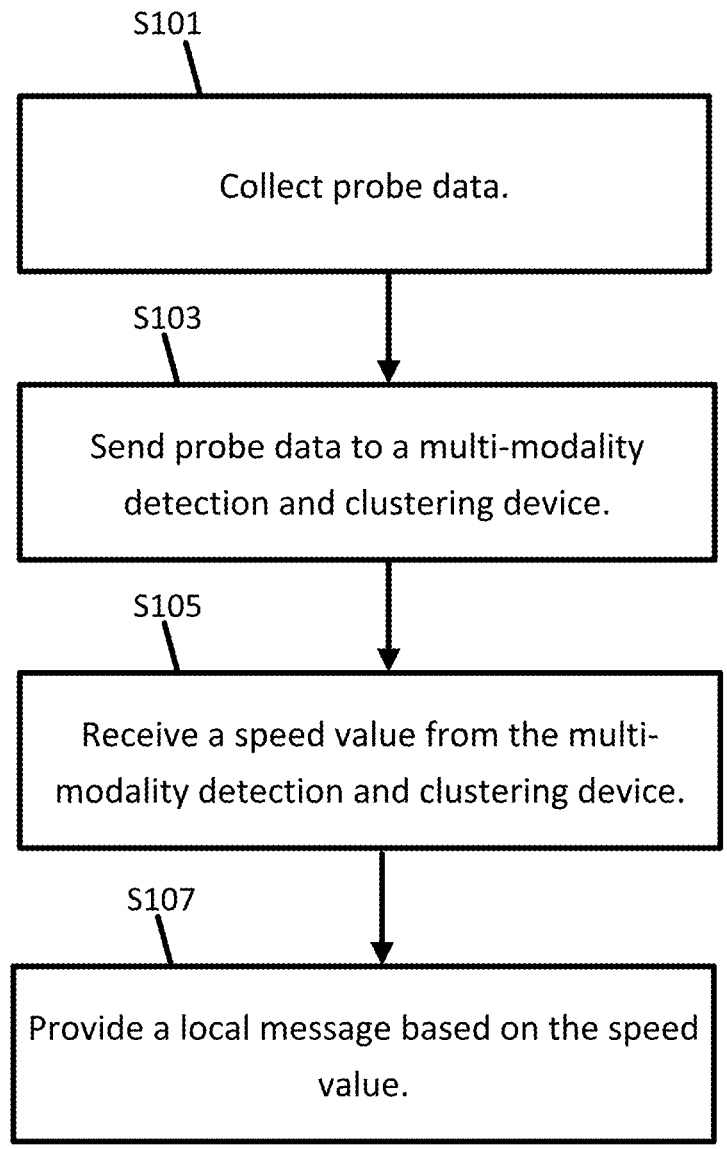
FIG. 11 illustrates an example flowchart for determining speed values for a variable speed sign.
Figure 12:
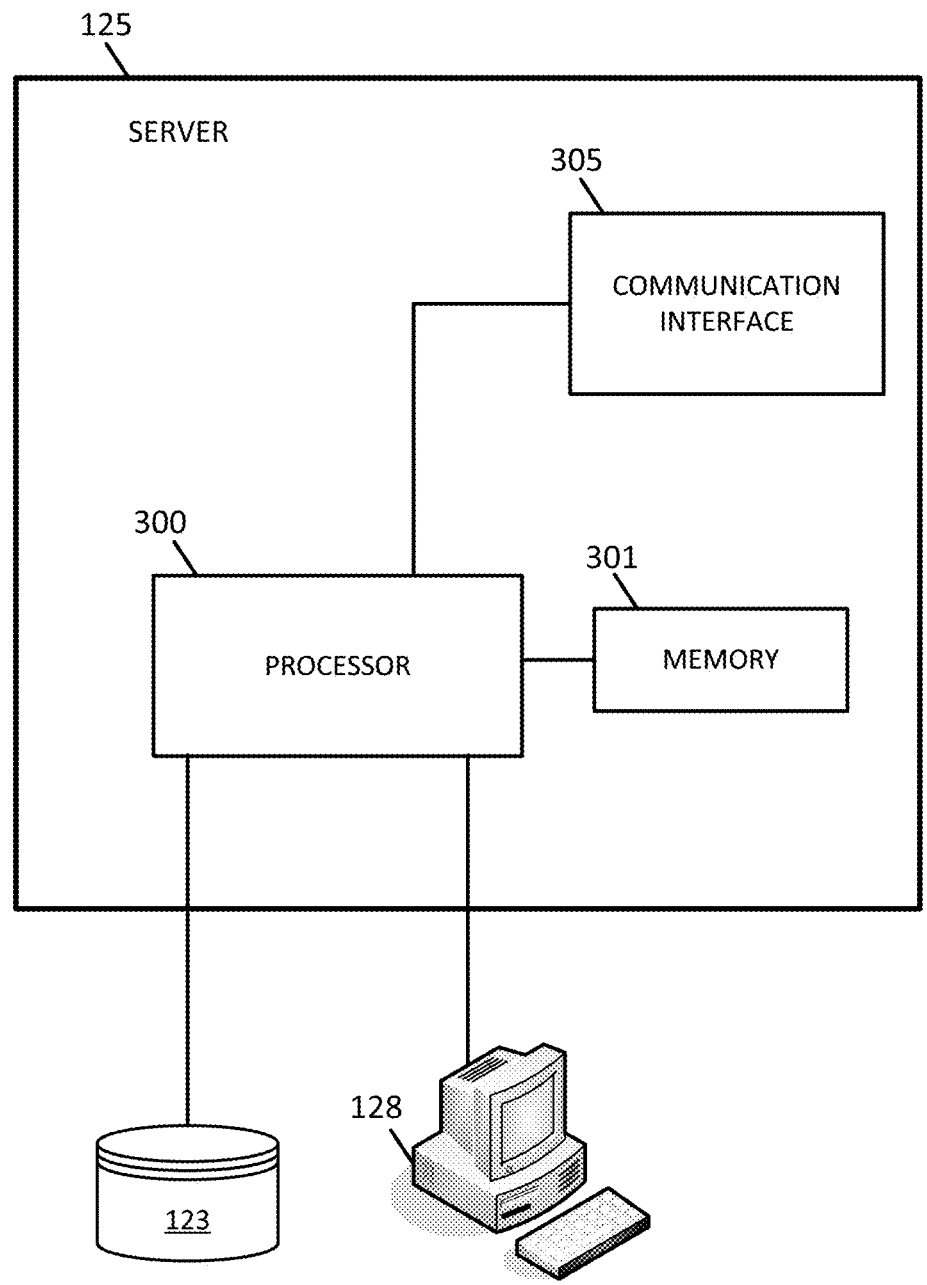
FIG. 12 illustrates an example network device of the system of FIG. 1.
Figure 13:
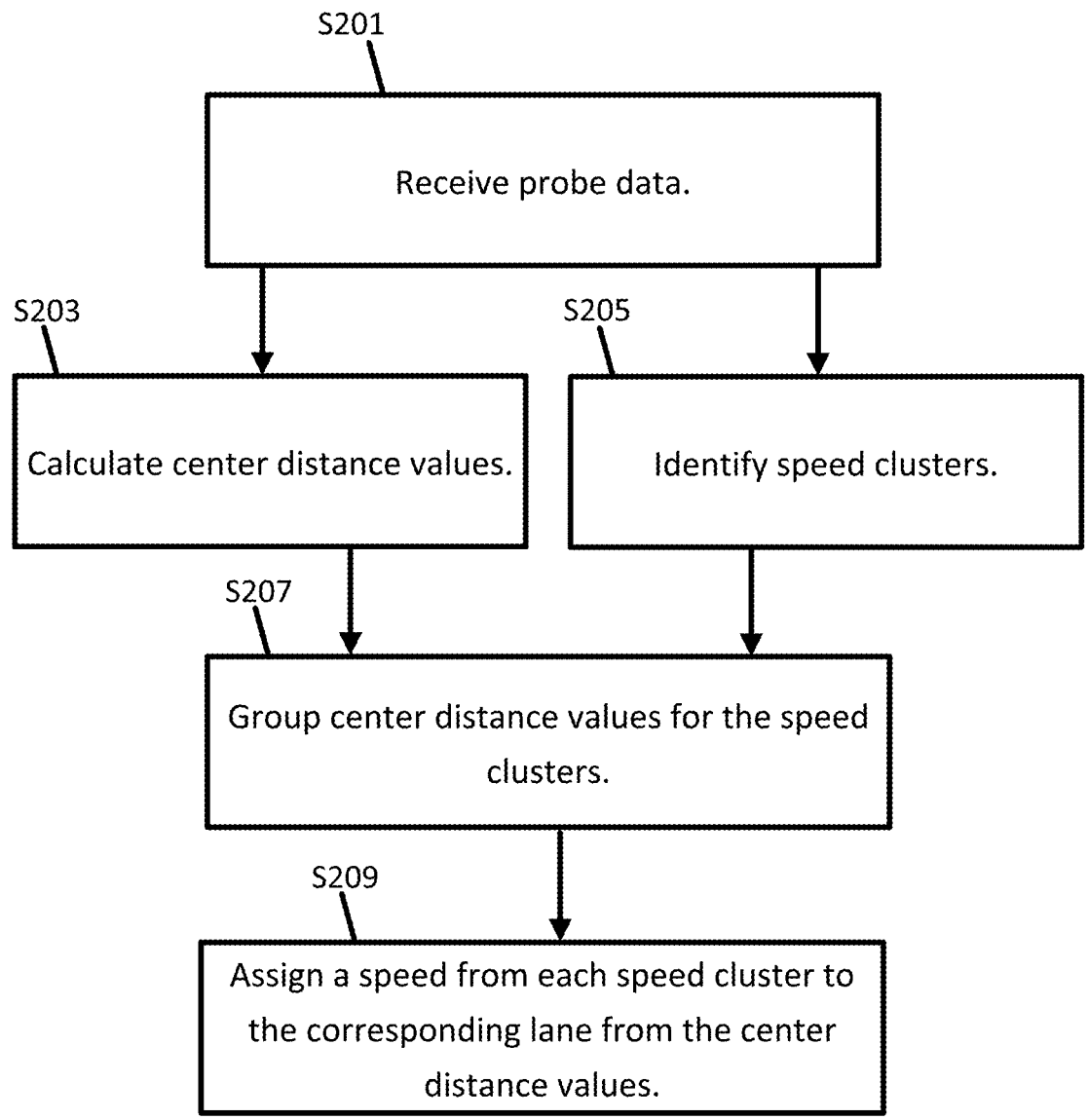
FIG. 13 illustrates an example flowchart for determining speed values for a variable speed sign.

FIG. 11 illustrates an example flowchart for determining speed values for a variable speed sign. The acts of the flowchart of FIG. 11 may be performed by a mobile device, an advanced driving assistance system (ADAS), a HAD device or an autonomous vehicle, any of which may be referred to as a computing device. Different, fewer, or additional acts may be included.

At act S101, probe data is collected by one or more computing devices traveling along one or more road segments. The probe data may be collected by position circuitry 207. The probe data may be continuously collected or collected only in response to a command, either from the local use of the computing device or from a server. In one example, the computing device includes an application with permission to activate probe data collection in response to a command from the server. In one example, the server may identify potential changes in the VSS and activate probe data collection in response. The position circuitry 307 may be a means for collecting probe data.

The probe data may include only location data with timestamps. The probe data may be collected downstream of a VSS. In one example, the probe data is organized by VSS such that a database of probe data indexes the probe data according to road segments including a VSS or downstream of the VSS. The probe data may be indexed based on individual lanes of the road segments.

At act S103, the probe data is sent to an external device. The external device may be a multi-modality detection and clustering device, a server or a central vehicle computer in communication with the mobile device. The location data and time may be manipulated to calculate the speed of the computing device. In one example, the probe data is stored later download for analysis to the external device. The communication interface 205 may include circuitry or a module or an application specific controller as a means for sending the probe data to the external device.

The external device may perform the MDC algorithm described herein, including calculation of center distance values for the location values, analysis of the speed values of the probe data to identify a cluster of probe data, and assignment of a speed for the cluster of probe data based on a center distance value assigned to the cluster of probe data.

At act S105, the mobile device 122 receives a message including a speed value from the external device. The message may be broadcasted to at least one vehicle traveling near the lane. The message may be pushed to the mobile device 122 based on location. The message may be sent through traffic message channel (TMC) or another system. The speed value may be the low speed limit value, the medium speed limit value, and the high speed limit value. The speed limit value may be received through a cellular connection, wireless Internet connection, or direct communication with the external device. The speed limit value may be broadcast to multiple computing devices in addition to the computing devices that collected probe data. That is, a first set of mobile devices may collect the probe data and a second set of mobile devices may receive the speed limit value. The second set may include the first set, the second set may be mutually exclusive of the first set, or the second set may partially overlap the first set. The processor 200 or the communication interface 205 may include circuitry or a module or an application specific controller as a means for receiving the message including the speed value for assigning to the lane associated with the VSS.

At act S107, the computing device provides the speed limit value in a message. In one example, the speed limit value is provided to the user by displaying the speed limit value on a screen (e.g., display 211). In another example, the speed limit value is provided to a navigation application, which may be internal or external to the mobile device, and the navigation application compares the current speed of the vehicle to the speed limit value. When the current speed exceeds the speed limit value, the navigation application may generate a speed warning to the user. In another example, the speed limit value is provided to a driving assistance application, which may be internal or external to the mobile device, and the driving assistance application may be configured to generate a driving command to modify the operation of the vehicle based on the speed limit value. For example, the driving command may instruct the vehicle (e.g., an engine control unit) to increase the throttle, decrease the throttle, apply more braking force, apply less braking force, or another driving function in response to the predicted or estimated speed limit value. The processor 300 may include circuitry or a module or an application specific controller or the display 211 may be a means for providing the speed limit value to a user.

In another example, at act S205, the computing device receives the speed limit value for the current lane of the vehicle as well as the speed limit values from other lanes of the current road segment from the external device. The computing device may compare the possible speed limit values and identify the lane with the highest speed limit value to the user. The navigation application may determine whether or not to instruct the user to change lanes based on a current route (e.g., whether or not the route include an exit within a certain distance) and the speed limit values from other lanes. In another example, the driving assistance application may steer the vehicle to another lane based on the speed limit values from other lanes.

FIG. 9 illustrates an exemplary server 125 of the system of FIG. 1. The server 125 includes a processor 300, a communication interface 305, and a memory 301. The server 125 may be coupled to a database 123 and a workstation. The workstation may be used as an input device for the server 125. In addition, the communication interface 305 is an input device for the server 125. In certain embodiments, the communication interface 305 may receive data indicative of user inputs made via a workstation or the navigation device 122. FIG. 11 illustrates an example flowchart for determining speed values for a variable speed sign, for example, using the MDC algorithm. The acts of the flowchart of FIG. 11 may be performed by server 125 or another device.

At act S201, the server 125 or the processor 300 receives probe data from multiple vehicles. The server 125 may determine which probe data points are associated with particular road segments using map matching. The memory 301 is configured to store probe data collected at the vehicles associated with a road segment. The processor 300 or communication interface 305 may include circuitry or a module or an application specific controller as a means for receiving probe data.

At act S203, the server 125 or the processor 300 calculates the center distance values. For each probe data, the server 125 may identify a center line of the associated road segment and calculate a distance from the location of the probe to the center line. The center line may be the location of the road segments. For example, a road segment may be stored in the geographic database as a one-dimensional line having no width. The center line may be calculated from a two-dimensional representation of the road segment. The processor 300 may include circuitry or a module or an application specific controller as a means for calculating the center distance values.

At act S205, the server 125 or the processor 300 identifies speed clusters from the probe data. Speed values may be calculated by comparing successive location values. The clusters may be defined according to a clustering algorithm that groups like speeds together. In one example, if a predetermined percentage (e.g., 10%) of the speed values are within a predetermined range (e.g., 10 miles per hour). Each speed cluster is represented by a speed value, which may be the mean or a particular statistical representative of the speed cluster. The processor 300 may include circuitry or a module or an application specific controller as a means for identifying speed clusters.

At act S207, the server 125 or the processor 300 groups or assigns center distance values for the speed clusters. The center distance values that are associate with the probes in a speed cluster are grouped together and analyzed. In one example, the center distance values in the same speed cluster are averaged. Outliers may be removed before or during clustering. The outliers may be identified from a sparsely populated highest speed cluster. For example, when the top most speed cluster is smaller than the second most speed cluster, then the second most speed cluster is used to select the representative of the speed of the vehicles, and when the top most speed cluster is larger than the second most speed cluster, then the top most speed cluster is used to select the representative of the speed of the vehicles. The processor 300 may include circuitry or a module or an application specific controller as a means for assigning center distance values for the speed clusters.

At act S209, the server 125 or the processor 300 assigns a speed from at least one speed cluster to a lane determined by the respective center distance value. The quantity of lanes and arrangement of lanes may be determined based on the center distance values. When two groups of center distance values differ by more than a lane defining threshold, they are designated as different lanes. In another example, the number of lanes is accessed based on the associated road segment from the geographic database, and the clusters are assigned to lanes based on polarity and magnitude of the center distance values. Any number of lanes may be assigned. When two lanes are present, the processor 300 may assign a left lane to the first cluster of probe data in response to center distance values having a first polarity or direction and assign a right lane to the second cluster of probe data in response to center distance values having a second polarity or direction. When more than two lanes are present, the processor 300 may assign lanes based on the magnitudes of the center distance values. When there are two or more lanes left of the center line, the processor 300 may assign a first left lane to the first cluster of probe data in response to center distance values having an absolute value less than a threshold and assign a second left lane to the second cluster of probe data in response to center distance values having an absolute value greater than the threshold. The thresholds may be proportional to the width of the lanes as determined from the geographic database. The thresholds may be predetermined and/or entered by the user through the input device 203. The processor 300 may include circuitry or a module or an application specific controller as a means for assigning the speed value to the lane.

The server 125 may identify the probe data is relevant to a VSS. The locations of the VSS may be provided as a file or listing. The selection of relevant road links for a candidate VSS could be based on distance between the VSS and the road link and direction of travel of the road link. In one example, the mobile device 122 may generate location data indicative of the current location of the mobile device 122 and send the location data to the server 125, which queries the geographic database 123b for the appropriate road segment. In another example, the mobile device 122 may initially identify the road segment and send data indicative of the road segment to the server 125. Alternatively, the road segment may be selected independent from the physical location of the mobile 122. For example, a user may select a particular location on a map or a route may be calculated that includes multiple road segments. Any of these locations may be describes as a point or coordinate pair (e.g., longitude and latitude) or a region such as a polyline or bounding box. The region may correspond to a route, a neighborhood, or a town. The region may be selected manually by drawing the polyline.

The server 125 may select multiple road segments based on the geographic location. The road segments may be road segments that are downstream (i.e., the direction of traffic) of the VSS. The server 125 may select a predetermined number of road segments or the road segments that are a predetermined distance downstream of the location of the VSS or location received from the mobile device 122. The predetermined number of road segments and/or the predetermined distance may be configurable based on a configurable value. The configurable value may be set at different levels for different geographic regions. For example, configurable value may cause more road segments to be included in rural areas and fewer road segments to be included in urban areas. The configurable value may be specified for particular roads or particular cities. The configurable value may be set according to time of day or the day of the week. The configurable value may be a range (e.g., the number of selected road segments is more than X and less than Y).

The communication interface or communication device 305 is configured to send a mobile device a message generated in response to the speed assigned to the lane. The message may include a warning generated from the speed assigned to the lane or a traffic message generated from the speed assigned to the lane. The message may include an autonomous driving command generated from the speed assigned to the lane. The processor 300 may include circuitry or a module or an application specific controller as a means for generating the message in response to the speed assigned to the lane. The communication interface 305 may include circuitry or a module or an application specific controller as a means for transmitting the message to one or more vehicles.

The computing device processor 200 and/or the server processor 300 may include a general processor, digital signal processor, an application specific integrated circuit (ASIC), field programmable gate array (FPGA), analog circuit, digital circuit, combinations thereof, or other now known or later developed processor. The navigation device processor 200 and/or the server processor 300 may be a single device or combinations of devices, such as associated with a network, distributed processing, or cloud computing. The computing device processor 200 and/or the server processor 300 may also be configured to cause an apparatus to at least perform at least one of methods described above.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the navigation device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The input device 203 may be one or more buttons, keypad, keyboard, mouse, stylus pen, trackball, rocker switch, touch pad, voice recognition circuit, or other device or component for inputting data to the mobile device 122. The input device 203 and display 211 may be combined as a touch screen, which may be capacitive or resistive. The display 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GNSS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

In the above described embodiments, the network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an email or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following example embodiments of the invention are also disclosed:

Embodiment 1

A method comprising:
receiving probe data collected at a plurality of vehicles associated with a road segment;
determining location values for the probe data;
calculating, by a processor, center distance values for the location values based on the road segment;
determining speed values for the probe data;
performing, by the processor, an analysis on the speed values of the probe data to identify a first cluster of probe data and a second cluster of probe data;
assigning center distance values to the first cluster of probe data; and
calculating a lane assignment based on the center distance values assigned to the first cluster of probe data.

Embodiment 2

The method of embodiment 1, wherein the analysis on the speed values comprises:
identifying a first mode of the speed values; and
identifying a second mode of the speed values,
wherein the lane assignment and the first cluster of probe data are associated with the first mode of the speed values or the second mode of the speed values.

Embodiment 3

The method of any of the preceding embodiments 1 to 2, wherein the analysis on the speed values comprises:
detecting a number of speed limits based on a quantity of clusters including the first cluster of probe data and the second cluster of probe data.

Embodiment 4

The method of any of the preceding embodiments 1 to 3, wherein the analysis on the speed values comprises:

calculating a multimodal speed distribution based on the probe data.

Embodiment 5

The method of any of the preceding embodiments 1 to 4, further comprising:
selecting a speed value associated with the first cluster of probe data; and
providing the speed value as an estimate of a variable speed sign.

Embodiment 6

The method of any of the preceding embodiments 1 to 5, wherein the lane assignment assigns a speed value to a lane of the road segment.

Embodiment 7

The method of any of the preceding embodiments 1 to 6, wherein a warning is generated from the speed value.

Embodiment 8

The method of any of the preceding embodiments 1 to 7, wherein a traffic message is generated from the speed value.

Embodiment 9

The method of any of the preceding embodiments 1 to 8, wherein an autonomous driving command is generated from the speed value.

Embodiment 10

The method of any of the preceding embodiments 1 to 9, wherein the autonomous driving command includes a lane change instruction.

Embodiment 11

The method of any of the preceding embodiments 1 to 10, further comprising:
calculating a quantity of lanes from the analysis of speed values.

Embodiment 12

The method of any of the preceding embodiments 1 to 11, wherein calculating the lane assignment based on the center distance values assigned to the first cluster of probe data comprises:
assigning a left lane to the first cluster of probe data in response to center distance values having a first polarity or direction; and
assigning a right lane to the second cluster of probe data in response to center distance values having a second polarity or direction.

Embodiment 13

The method of any of the preceding embodiments 1 to 12, wherein calculating the lane assignment based on the center distance values assigned to the first cluster of probe data comprises:
assigning a first left lane to the first cluster of probe data in response to center distance values having an absolute value less than a threshold; and
assigning a second left lane to the second cluster of probe data in response to center distance values having an absolute value greater than the threshold.

Embodiment 14

An apparatus comprising:
a memory configured to store probe data collected at a plurality of vehicles associated with a road segment, wherein location values and speed values are derived from the probe data; and
a multi-modality detection and clustering device configured to calculate center distance values for the location values and analyze the speed values of the probe data to identify a cluster of probe data,
wherein a lane is assigned to a speed for the cluster of probe data based on a center distance value assigned to the cluster of probe data.

Embodiment 15

The method of any of the preceding embodiment 14, wherein the multi-modality detection and clustering device is configured to identify a first mode of the speed values and a second mode of the speed values, wherein the lane is assigned to the first mode of the speed values for the cluster of speed data.

Embodiment 16

The method of any of the preceding embodiments 14 to 15, wherein the multi-modality detection and clustering device is configured to determine a number of speed limits based on a quantity of clusters in the probe data.

Embodiment 17

The method of any of the preceding embodiments 14 to 16, further comprising:
a communication device configured to send a mobile device a message, wherein the multi-modality detection and clustering device generates the message in response to the speed assigned to the lane.

Embodiment 18

The method of any of the preceding embodiments 14 to 17, wherein the message includes a warning generated from the speed assigned to the lane or a traffic message generated from the speed assigned to the lane.

Embodiment 19

The method of any of the preceding embodiments 14 to 18, wherein the message includes an autonomous driving command generated from the speed assigned to the lane.

Embodiment 20

A non-transitory computer readable medium including instructions that when executed on a computer are operable to:
collect probe data associated with a road segment; and send the probe data to a multi-modality detection and clustering device configured to calculate center distance values for the location values and analyze the speed values of the probe data to identify a cluster of probe data, wherein a lane is assigned to a speed for the cluster of probe data based on a center distance value assigned to the cluster of probe data; wherein a message including the speed value is broadcasted to at least one vehicle traveling near the lane.

I claim:

1. A method comprising:
   receiving probe data collected at a plurality of vehicles associated with a road segment;
   retrieving location coordinates from the probe data;
   identifying a center line for the road segment;
   calculating, by a processor, center distance values based on differences between the location coordinates and the center line of the road segment;
   determining speed values for the probe data;
   performing, by the processor, an analysis on the speed values of the probe data to identify a first cluster of probe data and a second cluster of probe data;
   averaging center distance values for the first cluster of probe data to determine a representative center distance value for the first cluster of probe data; and
   determining a lane assignment for the first cluster of probe data based on the representative center distance value of the first cluster of probe data.

2. The method of claim 1, wherein the analysis on the speed values comprises:
   identifying a first mode of the speed values; and
   identifying a second mode of the speed values,
   wherein the lane assignment and the first cluster of probe data are associated with the first mode of the speed values or the second mode of the speed values.

3. The method of claim 1, wherein the analysis on the speed values comprises:
   detecting a number of speed limits based on a quantity of clusters including the first cluster of probe data and the second cluster of probe data.

4. The method of claim 1, wherein the analysis on the speed values comprises:
   calculating a multimodal speed distribution based on the probe data.

5. The method of claim 1, further comprising:
   selecting a speed value associated with the first cluster of probe data; and
   providing the speed value as an estimate of a variable speed sign.

6. The method of claim 1, wherein the lane assignment assigns a speed value to a lane of the road segment.

7. The method of claim 6, wherein a warning is generated from the speed value.

8. The method of claim 6, wherein a traffic message is generated from the speed value.

9. The method of claim 6, wherein an autonomous driving command is generated from the speed value.

10. The method of claim 1, wherein the autonomous driving command includes a lane change instruction.

11. The method of claim 1, further comprising:
    calculating a quantity of lanes from the analysis of speed values.

12. The method of claim 1, wherein calculating the lane assignment based on the center distance values assigned to the first cluster of probe data comprises:
    assigning a left lane to the first cluster of probe data in response to center distance values having a first polarity or direction; and
    assigning a right lane to the second cluster of probe data in response to center distance values having a second polarity or direction.

13. The method of claim 1, wherein determining calculating the lane assignment based on the center distance values assigned to the first cluster of probe data comprises:
    assigning a first left lane to the first cluster of probe data in response to center distance values having an absolute value less than a threshold; and
    assigning a second left lane to the second cluster of probe data in response to center distance values having an absolute value greater than the threshold.

14. An apparatus comprising:
    a memory configured to store probe data collected at a plurality of vehicles associated with a road segment, wherein location values and speed values are derived from the probe data; and
    a multi-modality detection and clustering device configured to calculate center distance values for the location values and analyze the speed values of the probe data to identify a first cluster of probe data and a second cluster of probe data,
    wherein a first representative center distance value is calculated for the first cluster of probe data based on an average of the center distance values for the first cluster of probe data and a second representative center distance value is calculated for the second cluster of probe data based on an average of the center distance values for the second cluster of probe data;
    wherein a first lane value is assigned to a first speed for the first cluster of probe data based on the first representative center distance value assigned to the first cluster of probe data and a second lane value is assigned to a second speed for the second cluster of probe data based on the second representative center distance value assigned to the second cluster of probe data.

15. The apparatus of claim 14, wherein the multi-modality detection and clustering device is configured to identify a first mode of the speed values and a second mode of the speed values, wherein the lane is assigned to the first mode of the speed values for the cluster of speed data.

16. The apparatus of claim 14, wherein the multi-modality detection and clustering device is configured to determine a number of speed limits based on a quantity of clusters in the probe data.

17. The apparatus of claim 14, further comprising:
    a communication device configured to send a mobile device a message, wherein the multi-modality detection and clustering device generates the message in response to the speed assigned to the lane.

18. The apparatus of claim 17, wherein the message includes a warning generated from the speed assigned to the lane or a traffic message generated from the speed assigned to the lane.

19. The apparatus of claim 17, wherein the message includes an autonomous driving command generated from the speed assigned to the lane.

20. A non-transitory computer readable medium including instructions that when executed on a computer are operable to:
    collect probe data associated with a road segment;
    send the probe data to a multi-modality detection and clustering device configured to calculate center distance values for location values and analyze speed values of the probe data to identify a cluster of probe data; and assign a lane to a speed for the cluster of probe data based on a representative center distance value assigned to the cluster of probe data based on an average of the center distance values for the probe data included in the cluster of probe data;

wherein a message including at least one of the speed values is broadcasted to at least one vehicle traveling near the lane.

* * * * *

UNITED STATES PATENT AND TRADEMARK OFFICE
CERTIFICATE OF CORRECTION

PATENT NO. : 10,553,110 B2  
APPLICATION NO. : 15/631320  
DATED : February 4, 2020  
INVENTOR(S) : James Adyemi Fowe Page 1 of 1

It is certified that error appears in the above-identified patent and that said Letters Patent is hereby corrected as shown below:

In the Claims

Claim 13; Line 1:  
Delete "calculating".

Signed and Sealed this  
Twenty-sixth Day of January, 2021

Drew Hirshfeld  
*Performing the Functions and Duties of the*  
*Under Secretary of Commerce for Intellectual Property and*  
*Director of the United States Patent and Trademark Office*